United States Patent [19]

Zimmermann

[11] 3,922,717

[45] Nov. 25, 1975

[54] SPIRAL DISC RECORDER USING A SINGLE MOTOR FOR TURNTABLE AND HEAD DRIVE

[75] Inventor: Joseph J. Zimmermann, Elm Grove, Wis.

[73] Assignee: GTE Automatic Electric Laboratories Incorporated, Northlake, Ill.

[22] Filed: Dec. 4, 1974

[21] Appl. No.: 529,327

[52] U.S. Cl. .................... 360/75; 360/86; 360/107

[51] Int. Cl.² .................... G11B 21/04; G11B 17/02

[58] Field of Search .......................... 360/75, 86, 107

[56] References Cited

UNITED STATES PATENTS

| | | | |
|---|---|---|---|
| 2,800,642 | 7/1957 | May | 360/86 |
| 2,811,709 | 10/1957 | Haselton et al. | 360/107 |
| 3,047,663 | 7/1962 | Zimmermann | 360/86 |

*Primary Examiner*—Robert S. Tupper
*Attorney, Agent, or Firm*—Robert J. Black

[57] ABSTRACT

Apparatus in an automatic telephone answering device utilizing a single motor for scanning a tone arm across a grooveless recording disc to selectively play back a message magnetically recorded thereon in a spiral path as well as for rotating the turntable. The apparatus includes an electromagnetic clutch powered by a positive belt drive coupled to the motor for driving a spirally contoured cam to transport the tone arm across the disc. A control circuit including an optoelectronic switch positioned adjacent the edge of the turntable to receive light reflected from a reflective spot on the turntable edge is also provided to initiate scanning by the tone arm coincident with the reflective spot passing by the optoelectronic switch. This insures that the tone arm transducer will begin scanning at the same point for each subsequent playback and/or record operation and, as a result, track the spiral recording path on the grooveless disc.

4 Claims, 3 Drawing Figures

SPIRAL DISC RECORDER USING A SINGLE MOTOR FOR TURNTABLE AND HEAD DRIVE

BACKGROUND OF THE INVENTION

The present invention relates generally to automatic telephone answering apparatus and more particularly to a variable message recorder incorporating a grooveless disc for magnetically recording messages for playback and having a single motor to provide both turntable drive and spiral scanning of the disc and an optoelectronic system to initiate scanning at the same point on the disc for each successive record or playback operation.

Reference may be made to the following United States patents: U.S. Pat. Nos. 3,500,363; 3,474,427; 3,250,856; 3,050,585; 2,975,238; and 2,680,150.

Automatic telephone answering apparatus is often used to monitor a subscriber's telephone for receipt of incoming calls in the subscriber's absence and to automatically transmit a pre-recorded message to the calling party in response thereto. Provision is also commonly made for recording a message from the caller for subsequent playback by the subscriber.

Prior art recorders employing phonographic-type apparatus using grooved discs or records for recording messages and tracking the associated transducer during playback have frequently been used in automatic telephone answering machines, dictating machines, and the like. One significant disadvantage of systems using a grooved disc, however, is that the grooved disc requires the use of a transducer having a very narrow poleface. Because of the extremely small surface area of the poleface bearing down on the groove of the disc, the per unit area loading pressure is very high, and accordingly, the life of the transducer is short.

Answering devices utilizing a grooveless disc and having a tone arm traversing the disc in a spiral fashion without following any mechanical groove to magnetically record and/or play back messages have been developed. These devices permit the use of a magnetic transducer having a much wider poleface to thereby reduce the per unit area loading. More particularly, these discs are generally similar in size and shape to the conventional grooved disc or record and are rotated on a conventional turntable. The tone arm is positioned adjacent the disc and rotated to permit radial scanning of the transducer across the disc. The magnetic transducer is disposed immediately adjacent the surface of the disc to either magnetically record a message on the disc or to play back a previously recorded message. Since the disc is grooveless, special processing of the disc is eliminated so that the disc can be cut from any recording stock having randomly oriented magnetic particles. However, elimination of the grooves precludes tracking of the tone arm across the disc by the usual mechanical interaction of the magnetic transducer riding in the spiral groove.

An alternative apparatus providing means for controlling the tone arm as it moves laterally across or scans a grooveless disc has previously been suggested in U.S. Pat. No. 3,047,663, issued July 31, 1962, to the inventor of the present invention and assigned to Electronic Secretary Industries, Inc. There, it was suggested to employ a spirally contoured cam driven by a first motor to move the follower arm of a tone arm assembly so that the tone arm automatically scans the disc as it rotates on a turntable driven by a second motor.

As the transducer scans or moves laterally across the rotating, grooveless disc, the message is recorded as a spiral magnetized line or path on the disc surface. Therefore, it is essential that the transducer be reset to the exact starting point of the message path for each successive playback. If the tone arm is not reset so that the magnetic transducer is at the starting point of the spiral path, the transducer will not follow the original path but rather will follow a different path. Of course, if the transducer does not follow the original spiral magnetized path, proper sound reproduction is not possible.

It was recognized in the aforementioned U.S. Pat. No. 3,047,663, however, that the positive or directly driven spiral cam, although normally providing satisfactory results, does not take into account wear and slippage within the mechanism which may result in error in tracking the magnetized sound track.

Accordingly, an elaborate switching system including a synchronizing and latching switch was provided for automatically enabling the motor driven cam to radially scan the tone arm across the record in synchronism with the disc being rotated to a particular rotational position, thereby insuring that the transducer follows the spiral track. The switch, mounted adjacent the turntable periphery, is periodically closed by physical contact with a small protrusion on the edge of the turntable thereby determining the starting point of the message track. Rotation of the turntable by the second motor is initiated through the complex switching system responsive to receipt of ringing current, i.e., whenever an incoming call is received. The synchronizing and latching switch combines with the remainder of the switching system to synchronize the initiation of tone arm scanning with the rotation of the turntable so that the transducer is set to the starting point of the message track to initiate scanning at the same point on the record every time.

There are, however, several disadvantages inherent in such a system. That is, two motors are required, as well as a complex switching system for properly synchronizing the operation of the motors to provide automatic tone arm scanning control. Moreover, the synchronizing and latching switch is subject to mechanical wear, substantially increasing the possibility that repairs will be needed. Finally, the switch must be carefully aligned with the turntable so that the synchronizing and latching switch is closed only when it contacts the protrusion, but not at any other time.

SUMMARY OF THE INVENTION

The automatic telephone answering apparatus of the present invention overcomes the aforesaid disadvantages by utilizing a single motor for scanning a tone arm having a magnetic transducer across a grooveless disc positioned on a turntable to selectively play back a message magnetically recorded on the disc in a spiral track as well as for rotating the turntable. Optoelectronic means are provided for synchronizing the initiation of tone arm scanning with the rotation of the turntable to insure that the magnetic transducer follows the spiral track during each successive record or playback operation.

More particularly, the apparatus comprises a follower arm coupled to the tone arm and a cam having a spirally contoured peripheral edge contacting the follower arm. An electromagnetic clutch is coupled to the cam and driven by belt means intercoupling the motor and the electromagnetic clutch for supplying drive from the motor to the clutch. The motor also rotatably drives the turntable. Optoelectronic means are coupled tothe electromagnetic clutch and monitor the rotation of the turntable to selectively enable the clutch to rotate the cam whenever the turntable initially rotates through a predetermined rotational position. The cam moves the follower arm as the cam is rotated to correspondingly move the tone arm laterally across the rotating disc. The optoelectronic means synchronizes the initiation of tone arm movement with a particular rotational position of the turntable so that the transducer follows the spiral track.

Simplified control means are also provided to synchronize the operation of the electromagnetic clutch with the motor. The control apparatus includes first switch means for momentarily applying a d.c. potential to the motor responsive to receipt of an incoming ringing signal by the automatic telephone answering device. Latching means including a first relay having a coil coupled in shunt with the motor and a pair of contacts coupled in shunt with the first switch means couples the d.c. potential to the motor after the first switch means is opened. The coil is enabled by the momentary application of d.c. potential to close the contacts to maintain a continuous supply of d.c. potential to the motor and the shunt connected coil. Means including a second switch means and a second relay for selectively enabling the electromagnetic clutch to scan the tone arm assembly across the disc is also provided. The second switch means is coupled in series with the electromagnetic clutch to shunt the motor while the second relay has a first pair of contacts interposed in series between the second switch means and the electromagnetic clutch, a second pair of contacts coupled in shunt with the second switch means, and a coil coupled in shunt with the motor and the electromagnetic clutch intermediate the second switch means and the first contact pair. The second switch means momentarily closes to couple the d.c. potential to the second relay coil whenever the turntable rotates through a predetermined rotational position. The second relay coil is then enabled by the momentary application of d.c. potential to close the first and second contact pairs to maintain a continuous supply of d.c. potential to the second relay coil and the electromagnetic clutch.

BRIEF DESCRIPTION OF THE DRAWINGS

The features of the invention which are believed to be novel are set forth with particularity in the appended claims. The invention together with its further objects and advantages thereof may be best understood, however, by reference to the following description taken in conjunction with the accompanying drawing, in which like reference numerals identify like elements in the several figures and in which:

DETAILED DESCRIPTION

Figure 1:
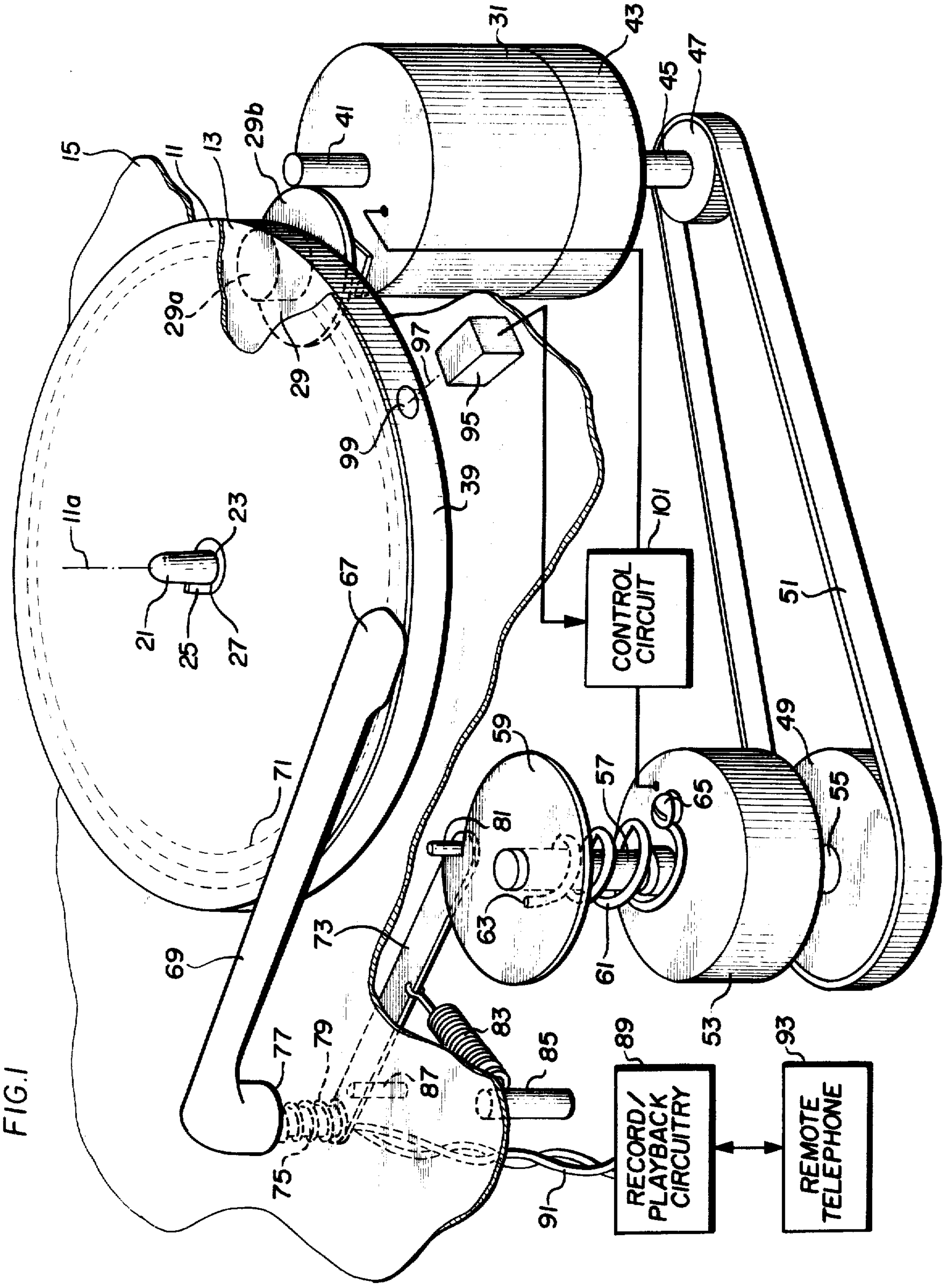
FIG. 1 is a perspective view of the apparatus of the present invention with portions thereof cut away to simplify the explanation of and better illustrate the present invention.
Figure 2:
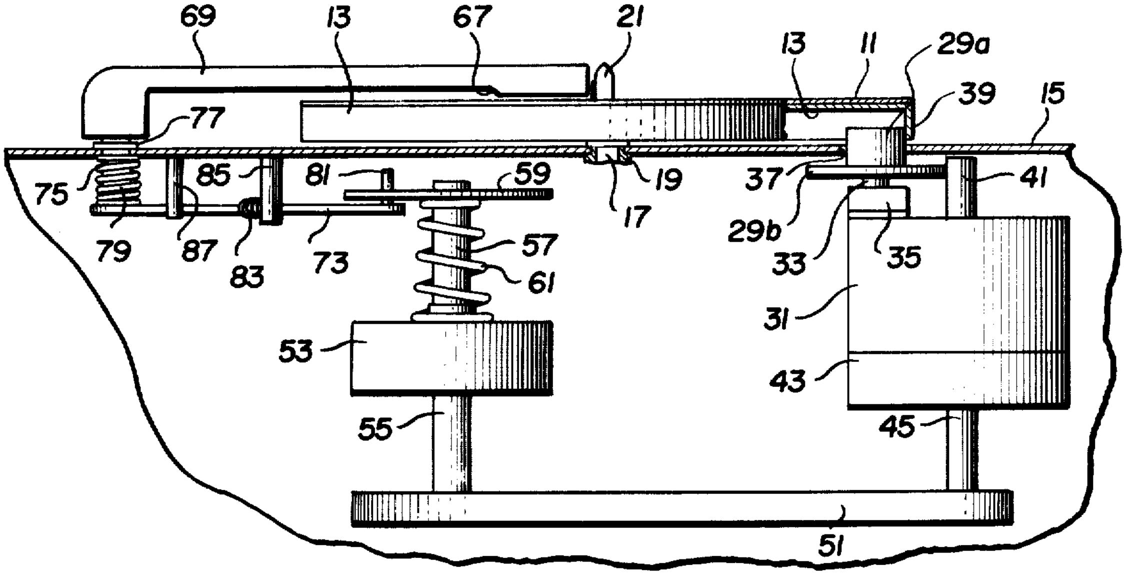
FIG. 2 is a side elevational view of the apparatus shown in FIG. 1.

Referring now to FIGS. 1 and 2, there is shown automatic telephone answering appratus wherein a thin, flat, cylindrical, grooveless recording disc 11 suitable for magnetically storing message information thereon for subsequent playback is supportably rotated about its center axis 11*a* by a turntable 13.

The turntable 13, in turn, is mounted on a platform 15 by a center pivot shaft 17 extending downwardly from turntable 13 to engage a bearing 19 in platform 15 so that the turntable 13 is freely rotatably about axis 11*a*. A centering pin 21 extends upwardly from the center of the turntable 13 to engage a corresponding center aperture 23 in the recording disc 11 when the disc 11 is positioned on turntable 13. An integral key element 25 extends from the centering pin 21, forming a unitary component therewith, and engages a corresponding slot 27 in disc 11 provided immediately adjacent the center aperture 23 thereby preventing slippage between the disc 11 and the turntable 13.

The turntable 13 is rotated at constant speed by a differential friction gear 29 which, in turn, is driven by a synchronous motor 31 mounted on the bottom side of platform 15. The differential friction gear 29 is rotatably mounted on a pivot shaft 33 on a flange 35 attached to the motor 31 and extends upwardly through an aperture 37 in the platform 15 to engage the turntable 13. In particular, the friction gear 29 comprises a first drum-like portion 29*a* which is in direct contact with the inside surface of the edge or rim 39 of turntable 13 and a second drum-like portion 29*b* below platform 15 having a larger diameter than portion 29*a*. Portion 29*b* extends outwardly beyond turntable 13 below the platform 15 to engage a shaft 41 driven by the adjacently positioned motor 31. As the motor 31 drives shaft 41, the differential friction gear 29 is correspondingly driven by motor 31 due to frictional contact between shaft 41 and gear portion 29*b*. Accordingly, since the upper gear portion 29*a* is also in frictional contact with the inner surface of the turntable rim 39, the motor 31 is effective to rotatably drive turntable 13 and hence disc 11.

The synchronous motor 31 is also effective to power the tone arm assembly so that the disc 11 is scanned in a spiral fashion by the magnetic transducer as it is moved laterally across disc 11. More particularly, a gear box 43 is operatively connected to the end of the synchronous motor 31 opposite shaft 41 to drive a shaft 45 extending from the gear box 43. A pulley 47 is coupled to the end of shaft 45 to drive a second pulley 49 by means of a drive belt 51 looped around and tensioned against pulleys 47 and 49 in the well known manner. The second pulley 49 is coupled to an electromagnetic clutch 53 by a rotatable shaft 55.

The electromagnetic clutch 53, responsive to the belt drive from motor 31, is selectively engaged to drive a shaft 57 extending therefrom in an upward direction to rotate a cam 59 mounted on the upper end of shaft 57. The cam 59 is spring-biased to an initial starting position, as illustrated in FIG. 1, a thin, coil spring 61 encircling the shaft 57 between the clutch 53 and the cam 59. One end of spring 61 is hooked through an aperture 63 in cam 59 while the other end is attached to the flat, top surface of the electromagnetic clutch 53 by a screw 65.

The cam 59, in turn, drives a tone arm assembly comprising a magnetic recording/playback transducer 67 mounted on the free-moving end of the tone arm 69. The transducer 67 is scanned laterally across the flat, top surface of disc 11 from outside to center, the radial scanning of the tone arm 69 across the disc 11 and the rotation of the turntable 13 combining to enable the transducer 67 to monitor the spiral track (illustrated by dashed line 71 in FIG. 1) on the disc 11 whereon the message information is magnetically recorded.

In particular, the tone arm assembly includes a follower arm 73 coupled to the tone arm 69 in a fixed parallel alignment therewith by a pivot shaft 75. The tone arm 69 curves downwardly at its pivoted end to rest on the platform 15 and is rigidly secured to the upper end of the pivot shaft 75 which extends downwardly through an aperture 77 in the platform 15. The follower arm 73 is rigidly attached to the bottom end of shaft 75, and a thin, coil spring 79 encircles the shaft 75 to prevent random vertical movement of the tone arm 69. A pin 81 extends upwardly from the free moving end of the follower arm 73 to contact the peripheral edge of the cam 59. The follower arm 73 is spring-biased against the edge of the cam 59 by a bias spring 83 coupled between a point intermediate the end of the follower arm 73 and a stationary anchor post 85 secured to the bottom side of the platform 15. A second post 87 is attached to the bottom side of the platform 15 immediately adjacent the follower arm 73 to prevent the follower arm 73 from being biased too strongly against the edge of cam 59. Thus, the cam 59 is adapted to move the follower arm 73 and thereby pivot the tone arm 69, which is in fixed alignment with the follower arm 73, across the recording disc 11.

The cam 59 illustrated in FIG. 1 has a spirally contoured peripheral edge such that rotation of the cam 59 moves the follower arm 73, and hence tone arm 69, at a uniform speed in an arc around the pivoted shaft 75. As the tone arm 69 pivots about the pivot shaft 75, the transducer 67 moves in a slight arc across the turntable 13 to scan the disc 11 is simultaneously rotated. The peripheral edge of the cam 59 is so proportioned that less than a complete revolution of the cam 59 moves the magnetic transducer 69 from the outer edge of the disc 11 to the center. Thus, the tone arm 69 is transported laterally across the disc 11 by the motor 31 in combination with the positive belt drive reduction system and the electromagnetic clutch 53. The magnetic transducer 67, in turn, converts the magnetically recorded information into electrical signals and couples it to the record/playback circuitry 89 of the apparatus via a pair of electrical conductors 91. The record/playback circuitry 89 then couples the message to the remotely located telephone 93 from which the incoming telephone call was received. The record/playback circuitry 89 may also be used to record a message on the disc 11.

In accordance with another aspect of the present invention, an optoelectronic switch 95 is provided to synchronize the initiation of scanning by the tone arm 69 and the rotation of turntable 13 so that the magnetic transducer 67 begins at the starting point of the spiral path 71 on the disc 11 for each subsequent playback or record operation, thereby insuring that the magnetic transducer 67 follows the magnetically recorded spiral message path 71 each time. The optoelectronic switch 95 is mounted adjacent the edge 39 of the turntable 13 and is spaced slightly therefrom. The optoelectronic switch 95 comprises a light emitting device for directing an incident light beam 97 toward the edge 39 of the turntable 13 and a light sensing device for detecting any of the incident light reflected back.

The edge 39 of the turntable 13 is coated with a non-reflective material or, alternatively, is constructed from a non-reflective material to generally absorb all of the incident light beam 97 directed thereto from the light emitting device of the optoelectronic switch 95. A small, reflective spot 99 is provided on the edge 39 of the turntable 13 and is effective to reflect the incident light 97 to the optoelectronic switch 95 whenever the spot 99 is in direct alignment with the optoelctronic switch 95. Accordingly, whenever reflected light is detected, the optoelectronic switch 95 closes, enabling a control circuit 101 coupled thereto. The control circuit 101, in turn, controls the electromagnetic clutch 53 and the motor 31 to initiate scanning by the tone arm 69 coincident with the reflective spot 99 on the turntable edge 39 initially passing by the optoelectronic switch 95. Thus, the transducer 67 tracks the spirally recorded information path 71.

Figure 3:
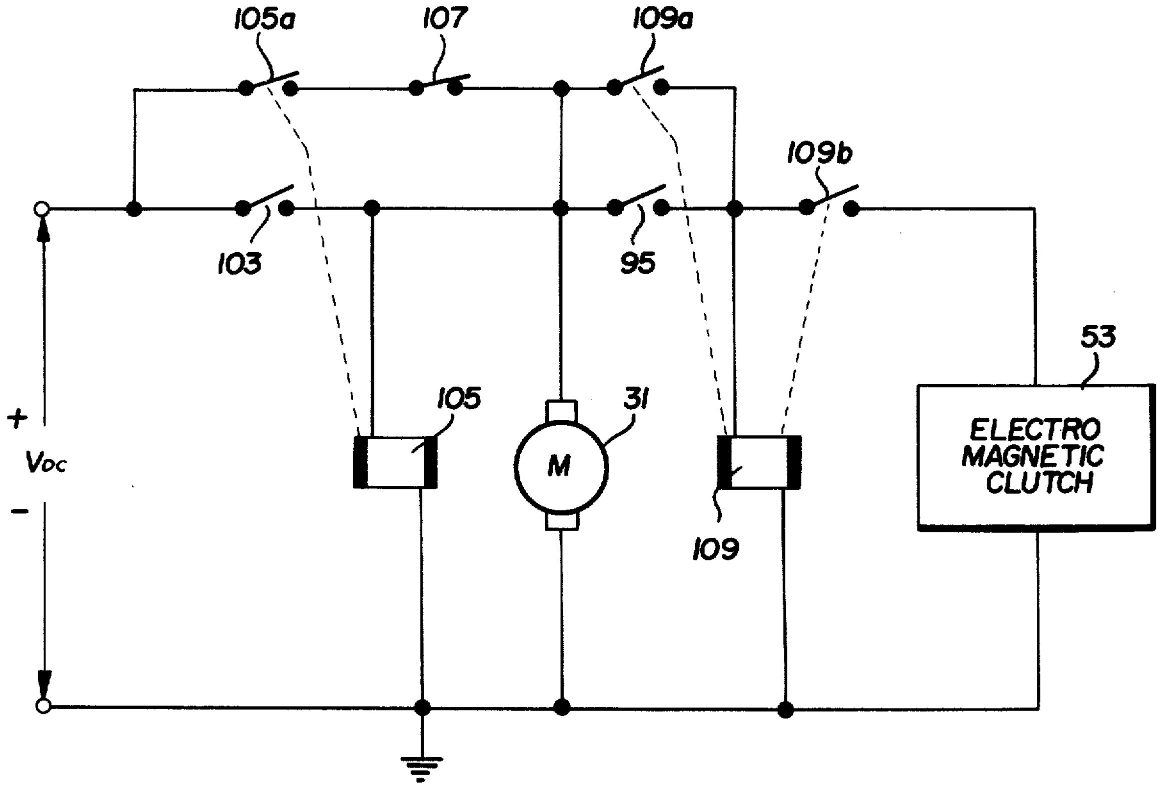
FIG. 3 is a schematic diagram illustrating simplified means for controlling the apparatus shown in FIGS. 1 and 2.

The control circuit 101 is shown in greater detail in FIG. 3. There, it can be seen that the synchronous motor 31 is coupled across a source of d.c. operating ($V_{DC}$) potential by a relay 103 such as the ringing relay in the telephone answering apparatus. When the relay 103 closes responsive to an incoming telephone call, current is delivered through the relay 103 to the synchronous turntable drive motor 31. Alternatively, the relay 103 can be replaced by a push button switch which closes when depressed.

A time delay relay 105 is coupled in shunt with the synchronous motor 31 while the contacts 105*a* of the time delay relay 105 are coupled in series with the normally closed contacts of a relay 107 to shunt relay 103. Thus, whenever relay 103 is closed for a period of time longer than, for example, one-half second responsive to an incoming telephone call, the time delay relay 105 operates to close its associated contacts 105*a* to form a latched circuit between the d.c. voltage source, $V_{DC}$, and the synchronous motor 31 through the contacts 105*a* and the synchronous motor 31 through the contacts 105*a* and the normally closed contacts of relay 107 even though relay 103 subsequently opens. At this point, the motor 31 is running, but the tone arm 69 is not scanning.

Thereafter, when the reflective spot 99 on the turntable edge 39 is initially aligned with the optoelectronic switch 95, the optoelectronic switch 95 closes to supply d.c. potential from the $V_{DC}$ source to an opto slave relay 109. A first set of relay contacts 109*a* associated with the opto slave relay 109 are coupled in shunt with the optoelectronic switch 95, and a second set of contacts 109*b* associated with the opto slave relay 109 couples the optoelectronic switch 95 to the electromagnetic clutch 53 which is coupled in parallel with the motor 31.

Thus, when the optoelectronic switch 95 is momentarily closed responsive to the reflective spot being initially aligned therewith, the optoelectronic switch 95 enables the opto slave relay 109. Consequently, the d.c. operating potential, $V_{DC}$, is latched to the relay 109 through the contacts 109*a* to maintain the second set of contacts 109*b* in a closed state, even as the turntable 13 continues to rotate, so that the d.c. potential, $V_{DC}$, is coupled to the electromagnetic clutch 53. Accordingly, the clutch 53 is enabled to drive cam 59 and thereby initiate scanning by the tone arm assembly coincident with the reflective spot 99 being aligned with the optoelectronic switch 95. Since tone arm scanning begins at the same point for each successive playback or record operation, the transducer 67 will always retrace the path of the original recording.

When the pre-recorded message on the disc 11 has been played back, a tone of a particular frequency, pre-recorded on the disc 11 at the end of the message, is detected by the record/playback circuitry 89. In response thereto, the record/playback circuitry 89 opens relay 107 to remove the d.c. bias applied to the other components, i.e., the motor 31, the relays 105 and 109, and the electromagnetic clutch 53. As a result, the electromagnetic clutch 53 is disabled and power is no longer provided to the cam shaft 57. Accordingly, the cam 59 is reset to its initial starting position by spring 61 so that the tone arm assembly is correspondingly reset by the bias spring 83 to its initial position, ready for subsequent playback and/or record operations.

Accordingly, there has been shown and described herein apparatus utilizing a single motor, instead of two motors, for scanning a tone arm across a grooveless recording disc as well as for rotating the turntable. Moreover, an optoelectronic system has been provided for synchronizing the initiation of tone arm scanning with the rotation of the turntable so that the magnetic transducer follows the same spirally recorded path during each record or playback operation.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as should fall within the true spirit and scope of the invention.

What is claimed is:

1. In a telephone answering device having a turntable for rotating a grooveless disc positioned thereon and a movable tone arm having a magnetic transducer for selectively playing back a message magnetically recorded on said disc in a spiral track, apparatus comprising:

a follower arm coupled to said tone arm;

a cam having a spirally contoured peripheral edge contacting said follower arm;

an electromagnetic clutch coupled to said cam;

a motor drive means intercoupling said motor and said turntable for rotating said turntable;

belt drive means intercoupling said motor and said electromagnetic clutch for supplying drive from said motor to said electromagnetic clutch; and optoelectronic means coupled to said electromagnetic clutch for monitoring the rotation of said turntable and selectively activating said electromagnetic clutch to supply drive from said motor through said belt drive means to rotate said cam responsive to the intial rotation of said turntable through a predetermined rotational position, whereby said cam moves said follower arm as said cam rotates to correspondingly move said tone arm laterally across said rotating disc, and said optoelectronic means synchronizes the initiation of said tone arm movement with a particular rotational position of said turntable so that said transducer follows said spiral track.

2. Apparatus in accordance with claim 1 wherein said turntable has a peripheral rim having reflective spot means thereon and wherein said optoelectronic means includes switch means for directing an incident light beam toward said turntable rim and for monitoring said turntable rim for any of said incident light beam reflected therefrom by said reflective spot means, said optoelectronic switch means actuates said electromagnetic clutch responsive to sensing said incident light beam reflected by said reflective spot means.

3. Apparatus in accordance with claim 1 wherein said belt drive means includes a first pulley driven by said motor, a second pulley connected to said electromagnetic clutch means, and a continuous belt looped around and tensioned to engage said first and second pulleys, said motor driving said first pulley to correspondingly drive said electromagnetic clutch by said second pulley and said continuous belt.

4. Apparatus in accordance with claim 3 wherein said turntable has a downward extending peripheral rim having an inner surface and including a shaft extending from and driven by said motor and including a rotatable differential friction gear comprising a first drum-like portion in frictional contact with said inner rim surface and a second drum-like portion of larger diameter than said first drum-like portion in frictional contact with said shaft, said motor rotating to drive said differential gear and said turntable.

* * * * *